United States Patent [19]

Burrows et al.

[11] Patent Number: 5,216,166
[45] Date of Patent: Jun. 1, 1993

[54] INFRA-RED SENSITIVE PHOTOGRAPHIC MATERIALS

[75] Inventors: Ronald W. Burrows, Harlow; Kevin P. Hall, Leaden Roading, both of Great Britain

[73] Assignee: Minnesota Mining and Manufacturing Company, St. Paul, Minn.

[21] Appl. No.: 717,542

[22] Filed: Jun. 19, 1991

[30] Foreign Application Priority Data

Jun. 29, 1990 [GB] United Kingdom ............ 9014492

[51] Int. Cl.$^5$ ............ C07D 215/06; C07D 263/56; C07D 277/64; C07D 293/12
[52] U.S. Cl. ............ 546/165; 548/121; 548/150; 548/156; 548/219
[58] Field of Search ............ 548/156, 121, 219, 150; 546/165

[56] References Cited

U.S. PATENT DOCUMENTS

| | | | |
|---|---|---|---|
| 2,955,939 | 10/1960 | Brooker et al. | 430/522 |
| 4,153,463 | 5/1979 | Lea | 430/522 |
| 4,581,325 | 4/1986 | Kitchin et al. | 430/522 |
| 4,933,269 | 6/1990 | Parton et al. | 548/121 |
| 5,041,550 | 8/1991 | Lea et al. | 548/219 |
| 5,112,731 | 5/1992 | Miyasaka | 430/578 |

FOREIGN PATENT DOCUMENTS

| | | |
|---|---|---|
| 61-124939 | 6/1986 | Japan . |
| 0594148 | 2/1978 | U.S.S.R. . |
| 1049493 | 10/1983 | U.S.S.R. . |

Primary Examiner—Mary C. Lee
Assistant Examiner—Mary Susan H. Gabilan
Attorney, Agent, or Firm—Gary L. Griswold; Walter N. Kirn; Mark A. Litman

[57] ABSTRACT

Cyanine dyes are disclosed having a nucleus of the formula:

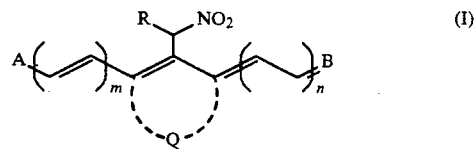

wherein;

A and B are independently selected from the group consisting of heterocyclic ring nuclei and heterocyclic fused ring nuclei so as to complete a cyanine dye, m and n independently have values of 0, 1, 2 or 3 with the proviso that $2 \leq m+n \leq 4$, R is selected from the group consisting of hydrogen, alkyl groups and aryl groups, each of which groups may be substituted, and Q represents those non-metallic atoms necessary to complete a nucleus selected from the group consisting of heterocyclic ring nuclei, carbocyclic ring nuclei, heterocyclic fused ring nuclei and carbocyclic fused ring nuclei.

The cyanine dyes of formula (I) may be used to spectrally sensitise silver halide grains to radiation in the wavelength range from 650 nm upwards, especially 700 to 850 nm, to provide infrared-sensitive, silver halide photographic materials which are particularly suitable for use with electronically modulated exposure sources, such as lasers and light emitting diodes.

12 Claims, 1 Drawing Sheet

INFRA-RED SENSITIVE PHOTOGRAPHIC MATERIALS

FIELD OF THE INVENTION

This invention relates to cyanine dyes and in particular to their preparation and use in photographic materials.

BACKGROUND TO THE INVENTION

At present there is a great need for a method of producing hard copies of electronically stored information using electronically modulated exposure sources such as lasers, laser diodes and light emitting diodes. As many of these devices produce radiation in the infrared region of the electromagnetic spectrum, infrared sensitive recording materials are required for imaging.

U.S. Pat. Nos. 2,955,939 and 4,591,325 disclose the use of meso-substituted cyanine dyes incorporating a barbituric acid substituent and a five membered bridging moiety on the methine chain, as spectral sensitisers.

U.S. Pat. Nos. 3,552,974 and 3,623,881 disclose the use of meso-amino substituted bridged chain heptamethine cyanine dyes as spectral sensitisers.

U.S. Pat. No. 4,153,463 and British Patent No. 1565593 disclose the use of meso-substituted trimethine cyanine dyes incorporating a nitroalkyl group as thermally bleachable antihalation dyes in Dry Silver materials. However, the dyes are not known as spectral sensitisers and appear to desensitise the material.

U.S. Pat. No. 4,283,487 and British Patent No. 1058116 disclose the use of merocyanine dyes incorporating a nitro-alkane end group as thermally bleached acutance dyes in Dry Silver materials.

European Patent No 288261 discloses a number of examples of cyanine dyes for use as sensitisers in the infrared region of the spectrum. In particular a cyanine dye is disclosed comprising a heptamethine chain bridged across its three central carbon atoms by a saturated fragment which completes a five or six membered ring. Furthermore the central atom of the heptamethine chain may have a substituent such as a halogen atom, substituted amino group or a ketomethylene moiety of the type known to the art of merocyanine and oxonol dye synthesis.

The prior art discloses the use of meso-substituted trimethine cyanine dyes incorporating nitroalkyl groups and merocyanine dyes incorporating nitroalkyl end groups for use as thermally bleachable anti-halation dyes in photothermographic material. However, such dyes are not known as spectral sensitisers in conventional silver halide photographic materials.

U.S. Pat. No 2,955,939 discloses the electron withdrawing meso-substituents on heptamethine cyanine dyes such as chloro, amino, barbituric acid and dicyanomethylene groups and they are stated to be good spectral sensitisers. However, cyanine dyes for use in spectral sensitisation of photographic materials almost invariably do not contain nitro substituents and generally their incorporation into a cyanine dye molecule, especially as a ring substituent, causes a decrease in the spectral sensitising ability of the dye and in some cases produces a desensitising dye, e.g., PINAKRYPTOL YELLOW.

BRIEF SUMMARY OF THE INVENTION

A class of cyanine dyes has now been found having a particular utility for the spectral sensitisation of silver halide materials to red-infrared radiation.

According to one aspect of the present invention there is provided a cyanine dye having a nucleus of general formula (I):

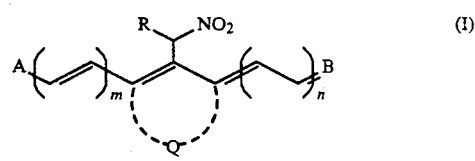

wherein;
- A and B are independently selected from the group consisting of heterocyclic ring nuclei and heterocyclic fused ring nuclei so as to complete a cyanine dye,
- m and n independently have values of 0, 1, 2 or 3 with the proviso that $2 \leq m+n \leq 4$,
- R is selected from the group consisting of hydrogen, alkyl groups and aryl groups, each of which groups may be substituted, and
- Q represents those non-metallic atoms necessary to complete a nucleus selected from the group consisting of heterocyclic ring nuclei, carbocyclic ring nuclei, heterocyclic fused ring nuclei and carbocyclic fused ring nuclei.

The cyanine dyes of general formula (I) may be used to spectrally sensitise silver halide grains to radiation in the wavelength range from 650nm upwards, especially 700 to 850 nm, to provide light-sensitive, silver halide photographic materials which are sensitive to radiation in the red-infrared region of the electromagnetic spectrum.

Therefore, according to another aspect of the present invention there is provided a photographic element comprising a support bearing a layer comprising light-sensitive silver halide grains spectrally-sensitised by a cyanine dye having a nucleus of general formula (I)

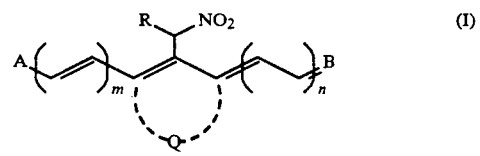

wherein:
- A and B are independently selected from the group consisting of heterocyclic ring nuclei and heterocyclic fused ring nuclei so as to complete a cyanine dye,
- m and n independently have values of 0, 1, 2 or 3 with the proviso that $2 \leq m+n \leq 4$,
- R is selected from the group consisting of hydrogen, alkyl groups and aryl groups, each of which groups may be substituted, and
- Q represents those non-metallic atoms necessary to complete a nucleus selected from the group consisting of heterocyclic ring nuclei, carbocyclic ring nuclei, heterocyclic fused ring nuclei and carbocyclic fused ring nuclei.

The photographic elements of the invention are particularly suitable for use with a number of commercially available laser diodes and light emitting diodes emitting in the infrared region of the electromagnetic spectrum. The sensitising dyes of formula (I) provide an unexpected and beneficially broad and flat range of sensitisation between about 750 to 800 nm. This is particularly advantageous as it means that the laser diode sources can have a wide range of output wavelengths (stemming from manufacturing variables) while the film containing the dyes of the invention would show the same effective sensitometry. Laser diode sources are well known to vary in output wavelength depending on manufacturing variables, temperature of use, etc.

BRIEF DESCRIPTION OF THE FIGURE

The FIGURE shows a wedge spectrogram of Dyes E and G between 700 and 900 nm.

DESCRIPTION OF THE PREFERRED EMBODIMENTS OF THE INVENTION

Figure 1A:
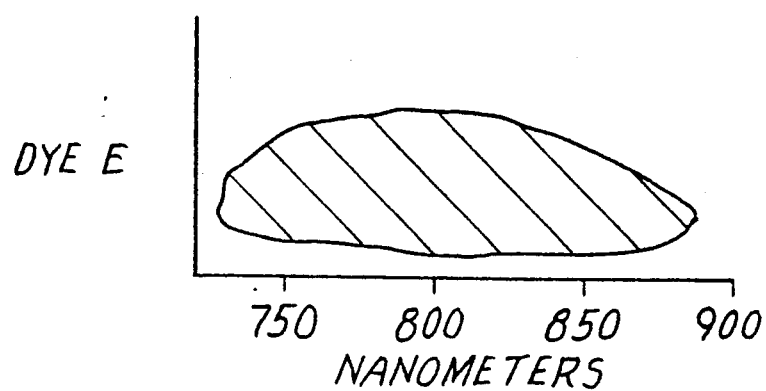
Figure 1B:
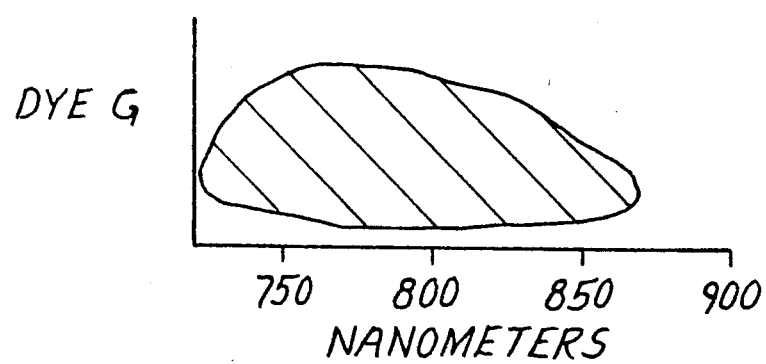

Groups represented by A and B may comprise any heterocyclic ring or fused ring nucleus suitable for the formation of a cyanine dye. A and B are normally independently selected from nitrogen-containing 5, 6 or 7-membered heterocyclic ring nuclei and heterocyclic fused ring nuclei of up to 14 ring atoms, each of which rings and fused ring nuclei may optionally possess one or more substituents selected from alkyl groups (e.g., methyl, ethyl, isopropyl, etc.), halogen atoms (e.g., fluorine, chlorine, bromine and iodine), a hydroxy group, alkoxy groups (e.g., methoxy, ethoxy, etc.), aryloxy groups (e.g., phenoxy, hydroxyphenoxy, etc.), amino groups (e.g., amino, methylamino, dimethylamino, etc.), a cyano group, acylamino groups (e.g., acetylamino, benzoylamino, etc.), diacylamino groups (e.g., succinimido, etc.), ureido groups (e.g., methylureido, etc.), sulfonamido groups (e.g., methanesulfonamido, etc.), acyloxy groups (e.g., acetyloxy, etc.), sulfamoyl groups (e.g., N-ethylsulfamoyl, etc.), alkylcarbonyl groups, arylcarbonyl groups, alkoxycarbonyl groups (e.g., methoxycarbonyl, ethoxycarbonyl, etc.), aryloxycarbonyl groups (e.g., phenoxycarbonyl, etc.), alkoxycarbonyl amino groups (e.g., ethoxycarbonylamino, etc.), carbamoyl groups (e.g., N-ethylcarbamoyl etc.), aryl groups (e.g., phenyl, tolyl, etc.), hydroxyalkyl groups (e.g., hydroxyethyl, hydroxypropyl, etc.), alkoxyalkyl groups (e.g., methoxyethyl, methoxypropyl, etc.), a mercapto group, alkylthio groups, arylthio groups, alkylsulfonyl groups, arylsulfonyl groups, acyl groups, aralkyl groups and alkyl groups containing a carboxyl group (e.g., carboxymethyl, carboxyethyl, etc.). Generally, the above defined substituent groups comprise up to 20 carbon atoms, preferably up to 14 carbon atoms and more preferably up to 10 carbon atoms.

Generally A and B complete identical groups and examples of preferred nuclei are oxazolium, thiazolium, selenazolium, benzoxazolium, benzothiazolium, benzoselenazolium, naphthoxazolium, naphthothiazolium, naphthoselenazolium, quinolinium, isoquinolinium, pyridinium, 3H-indolium, imidazopyridazinium, benzimidazolium, imidazolium, thiodiazolium, 5-methylbenzselenazolium, 5-methoxybenzthiazolium and 5-methyl-6-methoxy-benzoxazolium quaternary salts.

As is well understood in this technical area, a large degree of substitution is not only tolerated, but is often advisable. As a means of simplifying the discussion and recitation of these groups, the terms "group" and "moiety" are used to differentiate between chemical species that allow for substitution or which may be substituted. For example, the phrase "alkyl group" is intended to include not only pure hydrocarbon alkyl chains such as methyl, ethyl, octyl, cyclo-hexyl, isooctyl, tertbutyl and the like, but also such alkyl chains bearing such conventional substituents in the art such as hydroxyl, alkoxy, phenyl, halo (F, Cl, Br, I), cyano, nitro, amino, etc. The phrase "alkyl moiety" on the other hand is limited to the inclusion of only pure hydrocarbon alkyl chains such as methyl, ethyl, propyl, cyclohexyl, isooctyl, tertbutyl, and the like.

The length of the conjugated polymethine chain is determined by the values of m and n. Each may have integral values between 0 and 3 with the proviso that m+n can not be less than 2 or greater than 4. Preferably m has a value of 1 or 2 and n has a value of 1 or 2. The polymethine chain may optionally be substituted with one or more substituents known to the art of cyanine dye synthesis, such as halogen atoms, alkyl groups of 1 to 5 carbon atoms and alkoxy groups of 1 to 5 carbon atoms.

The polymethine chain includes a bridging or rigidising moiety completed by Q which represents the necessary non-metallic atoms to complete a 5, 6, or 7-membered heterocyclic or carbocyclic ring, or a fused ring system, generally containing up to a total of 14 ring atoms in the case of a multiple ring system. Each nucleus incorporates three carbon atoms of the polymethine chain with the remainder of the ring atoms selected from C, N, O, S and Se.

Q preferably completes a cyclopentene, cyclohexene or cycloheptene ring, however, other examples of ring structures completed by Q include:

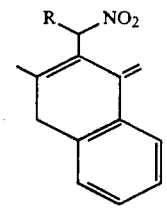

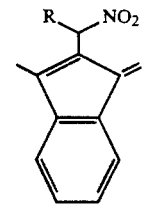

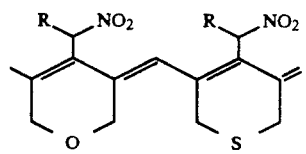

Groups represented by Q may optionally possess one or more substituents as defined for A and B. Preferred substituents include alkyl groups, aryl groups, aralkyl groups and alkoxy groups comprising up to 20 carbon atoms, preferably up to 14 carbon atoms and more preferably up to 10 carbon atoms, halogen atoms and the necessary non-metallic ring atoms to complete a fused ring substituent, e.g., a phenyl moiety. Examples of preferred substituted groups completed by Q include 4,4-dialkylcyclohexenes, such as 4,4-dimethylcyclohexene.

R represents a hydrogen atom, an alkyl group of up to 10 carbon atoms, more preferably up to 5 carbon atoms, or an aryl group of up to 14 carbon atoms, more preferably up to 10 carbon atoms, each of which groups may optionally possess one or more substituents as defined for A and B. Preferred examples of R groups are alkyl moieties such as methyl and ethyl.

A preferred class of cyanine dyes has a nucleus of general formula (II):

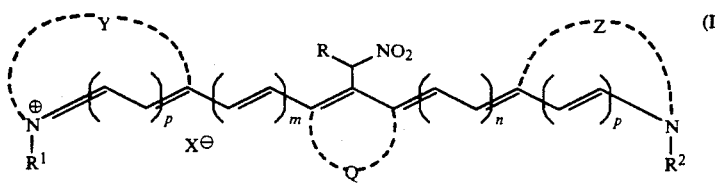

(II)

in which:
Y represents those non-metallic atoms necessary to complete a group defined by A,
Z represents those non-metallic atoms necessary to complete a group defined by B,
p has values of 0 or 1,
$R^1$ and $R^2$ represent a hydrogen atom or an alkyl group which may optionally be substituted,
$X^{\ominus}$ is an anion, and,
m, n, Q and R are as defined above.

Y and Z comprise those non-metallic atoms necessary to complete a heterocyclic ring or a fused ring system as detailed for A and B respectively. Generally Y and Z complete identical groups, each of which may possess one or more substituents as defined for A and B.

$R^1$ and $R^2$ independently represent hydrogen atoms or alkyl groups of up to 10 carbons, more preferably up to 5 carbon atoms which may optionally possess one or more substituents selected from alkyl, sulphoalkyl, carboxyalkyl and hydroxyalkyl groups of up to 5 carbon atoms, aryl groups of up to 10 carbon atoms and halogen atoms. Preferred examples of $R^1$ and/or $R^2$ are selected from alkyl moieties, such as methyl and ethyl, and sulphoalkyl moieties, such as propylsulphonate and butylsulphonate.

$X^{\ominus}$ is an anion which may be independent of the dye nucleus or it may optionally be incorporated into the $R^1$ and/or $R^2$ group. Preferred examples of free anions represented by $X^{\ominus}$ are iodide ($I^{\ominus}$) ions and p-toluene sulphonate ($C_7H_7SO_3^{\ominus}$). Examples of anions incorporated directly into the dye nucleus are when $R^1$ and/or $R^2$ represent sulphoalkyl groups such as propylsulphonate or butylsulphonate. Typically the anions are acidic anions such as chloride, bromide, iodide, thiocyanate, methylsulphate, ethylsulphate, perchlorate, p-toluenesulphonate ion, etc.

The dyes of general formula (I) may be prepared by synthesizing a dye intermediate of general formula (III) according to a modification of the protocol detailed in the Journal of the Chemical Society (J.C.S) pp. 606 to 608, (1934);

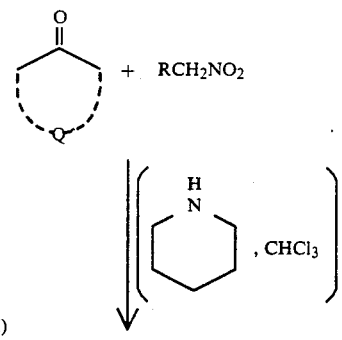

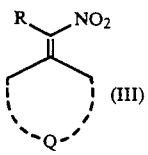

(III)

in which Q and R are as defined previously. Dye intermediate (III) is then treated in accordance with the following reaction scheme:

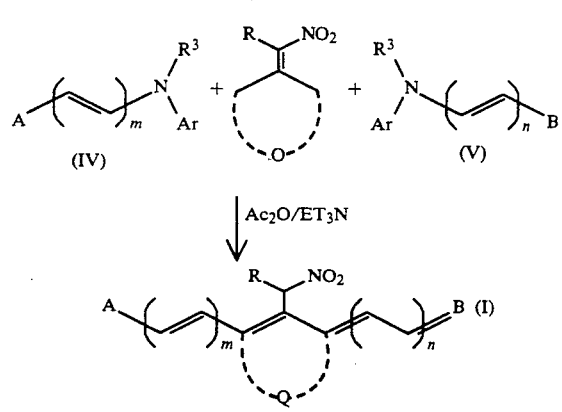

in which:
A, B, m, n, Q and R are as defined previously,
Ar represents an aryl group (preferably phenyl), and,
$R^3$ represents H or an acyl group (e.g., acetyl).

Intermediates represented by (IV) and (V) are well known in the art of cyanine dye synthesis, and may be prepared, for example, by reaction of an appropriate alkyl-substituted quaternised heterocycle with

where q = 0 or 1 and Ar is as defined above, followed (if $R^3$ = acyl) by treatment with $R^3$-0-$R^3$.

The reaction is conducted in solution at a temperature of from ambient to 150° C., typically about 100° C.

The photographic elements of the invention may comprise any suitable silver halide based imaging material including: colour papers, colour negative films, colour reversal films (either with or without couplers), photosensitive materials for printing plates (e.g. lith films), photosensitive materials for use with cathode ray tubes (CRTs), photosensitive materials for silver salt diffusion transfer processes, photosensitive materials for colour diffusion transfer processes, photosensitive materials for dye transfer processes (inhibition transfer processes), photographic emulsion for silver dye-bleach processes, photosensitive materials to record printout images, direct print image photosensitive materials, photosensitive materials for thermal development and photosensitive materials for physical development.

Such materials generally comprise a support having coated thereon, in one or more layers, a photographic silver halide emulsion, typically a gelatino silver halide emulsion. The material may also include one or more auxiliary layers, e.g. antihalation layers, filter layers, etc., which normally comprise a layer of a hydrophilic colloid into which is dissolved or dispersed the relevant photographic chemistry.

The dyes of general formulae (I) and (II) may be incorporated into the silver halide photographic emulsion using any of the conventional techniques for dye incorporation known in the art to sensitise the emulsion to radiation between 650 and 850 nm wavelength, more preferably 700 to 825nm. The dyes are generally incorporated into the emulsion in an amount from 0.5 to 500 mg per mole of silver halide, more preferably 5 to 250 mg per mole of silver halide.

The silver halide emulsion may comprise any of silver chloride, silver bromide, silver chlorobromide, silver iodobromide, silver iodochlorobromide, etc. The silver iodide content is preferably not more than 10 mol %, and more desirably is in the range of from 0.1 to 5 mol %.

In regard to the average grain size of silver halide used in accordance with this invention, fine grains, e.g. 1.0 micron ($\mu$m) or less, are preferable, and very fine grains not larger than 0.5 micron ($\mu$m) are particularly preferable. While the grain size distribution is optional, a monodispersion is preferable for printing plate and graphic arts applications. The term "monodispersion" as used herein means that, whether in weight or in number, at least 95% of grains are sized within ±40% of the mean grain size.

The silver halide grains in the photographic emulsion may be of regular crystals of cubic, orthorhombic, tabular, octahedral or tetrahedral habit, or irregular crystals such as spherical or composites.

Each of the silver halide grains may be made up of a uniform phase through its core and surface layer, or may be dissimilar in phase between the core and the surface. It is also possible to use two or more independently prepared silver halide emulsions as a mixture.

In the course of formation of silver halide grains or in the process of physical ripening, there may be added to the silver halide emulsion a cadmium salt, lead salt, thallium salt, rhodium salt or rhodium complex salt, iridium salt or iridium complex salt, ruthenium salt or ruthenium complex salt, or mixture of such salts or the like.

Gelatin is preferably used as the binder or protective colloid for the photographic emulsion, but other hydrophilic colloids and extenders can also be employed. For example, other useful materials might include gelatin derivatives, graft copolymers of gelatin to other high polymers, proteins such as albumin and casein, cellulose derivatives such as hydroxyethyl cellulose, carboxymethyl cellulose, cellulose sulphate esters, etc., sugar derivatives such as sodium alginate, starch derivatives, etc., and synthetic homo- or copolymers such as polyvinyl alcohol, poly-N-vinylpyrrolidone, polyacrylic acid, polymethacrylic acid, polyacrylamide, polyvinylimidazole and polyvinylpyrazole.

The silver halide emulsion may be chemically sensitized. Known methods for chemical sensitization of silver halide emulsions include sulphur sensitization, reduction sensitization and noble metal sensitization, and the chemical sensitization may be effected by any or a combination of such methods.

The usual method of the noble metal sensitization is gold sensitization and for this purpose, a gold compound, generally a complex salt of gold, is utilized. Complex salts of other noble metals such as platinum, palladium, rhodium, etc., may be additionally contained. Examples of this method are described in U.S. Pat. No. 244,806 and British Patent No. 618061.

Sulphur sensitizers include, in addition to sulphur compounds contained in gelatin, various sulphur compounds such as thiosulphates, thiourea compounds, thiazoles, and rhodanines.

Reduction sensitizers include stannous salts, amines, formamidinesulphinic acid, silane compounds and the like.

Supersensitisers may also be employed.

The photographic emulsions may be high contrast e.g. lith films, containing a hydrazine or other additives known in the art. Such materials are disclosed, for example, in U.S. Pat. Specification Nos. 2,322,027, 2,419,974, 2,419,975, 4,166,742, 4,168,977, 4,211,857, 4,2244,01, 4,743,739, 4,272,606, 4,272,614, 4,311,781 and 4,323,643.

The photographic elements may include a variety of compounds for the prevention of fog during production storage or photographic processing or for the purpose of stabilising the photographic qualities. Thus, for example, there may be added the compounds referred to commonly as antifoggants or stabilizers, for example, various azole compounds (such as benzothiazolium salts, nitroimidazoles, chlorobenzimidazoles, bromobenzimidazoles, mercaptothiazoles, mercaptobenzothiazoles, nitrobenzothiazoles, etc.), mercaptopyrimidines, thioketo compounds (such as oxazolinethione, etc.), azaindenes (such as triazaindene), tetraazaindenes (particularly, 4-hydroxy-substituted-(1, 3,3a,7)-tetraazaindenes), pentaazaindenes, etc.), benzenethiosulphonic acid, benzenesulphinic acid, benzenesulphonamide, etc.. Amongst these compounds, benzotriazoles (e.g., 5-methylbenzo-triazole) and nitroindazoles (e.g., 5-nitroindazole) are preferred. These compounds may also be incorporated in the processing solution.

The photographic elements may contain inorganic or organic hardening agents in the photographic emulsion layer or other hydrophilic colloid layer. For this purpose chromium salts (chrome alum, chromium acetate, etc.), aldehydes (formaldehyde, glyoxal, glutaraldehyde, etc.), N-methylol compounds (dimethylolurea, methylol-dimethylhydantoin, etc.), dioxane derivatives (2,3-dihydroxydioxane, etc.), active vinyl compounds (1,3,5-triacryloyl-hexahydro-s-triazines, 1,3-vinyl-sulphonyl-2-propanol, etc.), active halogen compounds (2,4-dichloro-6-hydroxy-s-triazine, etc.), mucohalogenic acids (mucochloric acid, mucophenoxy-chloric acid, etc.), and the like may be used. These hardening agents may be incorporated alone or in combination.

In the photographic emulsion layer or other hydrophilic colloid layer in the photographic material produced in accordance with this invention, a variety of surface active agents may be incorporated for various purposes, such as improvement of coating properties, antistatic properties, slip properties, emulsion dispersibility, anti-adhesion properties, and photographic properties (for example, development acceleration, increase in contrast, sensitization, etc.).

Nonionic surfactants may be employed such as saponin (steroidal), alkylene oxide derivatives (e.g., polyethylene glycol, polyethylene glycol/polypropylene glycol condensate, polyethylene glycol alkyl ethers, polyethylene glycol alkyl aryl ethers, polyethylene glycol esters, polyethylene glycol sorbitan esters, polyalkylene glycol alkylamines or alkylamides, silicone polyethylene oxide adducts), glycidol derivatives (e.g., alkenylsuccinic acid polyglyceride, alkylphenol polyglyceride), polyhydric alcohol-fatty acid esters, sugar alkyl esters, etc. Anionic surfactants containing acid groups such as a carboxyl groups, a sulpho group, a phospho group, a sulphuric acid ester group, a phosphoric acid ester group, etc., for example alkylcarboxylate, alkylsulphonates, alkylbenzenesulphonates, alkylnaphthalenesulphonates, alkylsulphuric acid esters, alkylphosphoric acid esters, n-acyl-n-alkyltaurines, sulphosuccinic acid esters, sulphoalkylpolyoxyethylene alkylphenyl ether, polyoxyethylene alkylphosphoric acid esters, etc., may be used. Amphoteric surfactants such as amino acids, aminoalkylsulphonic acids, aminoalkyl-sulphuric or phosphoric acid esters, alkylbetaines, amine oxides etc.; and cationic surfactant such as alkylamines, aliphatic or aromatic quaternary ammonium salts, heterocyclic quaternary ammonium salts such as pyridinium salts, heterocyclic quaternary ammonium salts such a pyridinium salts, imidazolium salts, etc., aliphatic or heterocyclic ring-containing phosphonium or sulphonium salts, etc. may be used.

In the photographic emulsion layer or the hydrophilic colloid layer of the photographic material according to this invention, matting agents such as silica, magnesium oxide, polymethyl methacrylate, etc., may be incorporated for the purpose of preventing adhesion.

The support of the photographic element may be made of an opaque material such as paper or a transparent film base such as cellulose triacetate, cellulose diacetate, nitrocellulose, polystyrene, polyester, polyethylene terephthalate or the like.

Suitable developer compositions for use in the invention are any of those known in the art useful for the particular emulsion selected.

There is no particular limitation of the developing agents that can be employed in the method of this invention. Thus, for example, dihydroxybenzenes (e.g., hydroquinone), 3-pyrazolidones (e.g., 1-phenyl-3-pyrazolidone, 4,4-dimethyl-1-phenyl-3-pyrazolidone), aminophenols (e.g., 4-methylaminophenol), etc., can be used alone or in combination.

The present invention may be used in photolithographic elements suitable for the preparation of lithographic printing plates. A preferred photolithographic element comprises a silver salt diffusion transfer system.

In the silver salt diffusion process, an imagewise exposed silver halide emulsion layer is positioned in intimate contact with a receptor element and developed in the presence of a silver halide solvent such that the unexposed silver halide diffuses into the receptor element where it is developed to provide an image. Development nuclei or catalyst, contained in the receptor element, cause the diffused silver halide to be reduced to metallic silver, thereby forming an image on the receptor element surface.

More specifically in the silver halide diffusion transfer process a developer composition is used which contains a developing agent, e.g., hydroquinone, a solubilizing agent for silver halide, e.g., thiosulphate ion and, preferably an antifoggant, e.g., benzotriazole. When an imagewise exposed plate is contacted with the developer composition, the light exposed silver halide grains are reduced to silver metal in normal fashion. The unexposed grains dissolve in the developer via formation of soluble silver complexes, such as the complexes of silver thiosulphate. When the soluble silver complex contacts a development nucleus or catalyst, typically contained in a receptor layer or element, the silver is reduced to a metallic deposit. This deposit can then form the ink receptive image areas of a lithographic plate.

Preferred photolithographic materials are described in U.S. Pat. Specification No. 4,361,635 which discloses a photolithographic light-sensitive sheet capable or providing a lithographic plate after imaging by diffusion transfer comprising a support, a silver halide emulsion layer overlying said support, and a receptor layer overlying said emulsion, said receptor layer containing catalytic nuclei for silver salt diffusion transfer development. Preferably the receptor layer comprises at least one high molecular weight hydrophilic polymer the major proportion of said polymer being a dialdehyde polysaccharide.

Photographic elements comprising dyes in accordance with the invention may be exposed by any suitable light source emitting in the near infrared. These include both continuous exposure sources, such as xenon flash lamps and tungsten filament bulbs, and line sources, such as lasers and light emitting diodes. The dyes of the invention provide an unusually broad and flat spectral response which makes them particularly suitable for use with line sources. Because the latter are susceptible to wavelength drift (e.g. due to temperature effects), it is important that the sensitometric properties of the photographic media vary as little as possible with such changes in exposure wavelength.

The invention will now be illustrated by the following examples in which dyes A to K of general formula (II) were of the structures presented in Table 1.

TABLE 1

| Dye | Z and Y completes | $R^1$ | $R^2$ | R | m | n | λ max MeOH) (nm) | $X^\ominus$ | Q completes | p |
|-----|---|---|---|---|---|---|---|---|---|---|
| A | (benzothiazole ring) | $C_2H_5$ | $C_2H_5$ | $CH_3$ | 1 | 1 | 713 | $I^\ominus$ | (cyclopentane ring) | 0 |

TABLE 1-continued

| Dye | Z and Y completes | $R^1$ | $R^2$ | R | m | n | λ max MeOH) (nm) | $X^\ominus$ | Q completes | p |
|---|---|---|---|---|---|---|---|---|---|---|
| B | benzothiazole | $C_2H_5$ | $C_2H_5$ | $C_2H_5$ | 1 | 1 | 712 | $I^\ominus$ | cyclopentene | 0 |
| C | quinoline | $C_2H_5$ | $C_2H_5$ | $CH_3$ | 1 | 1 | 860 | $I^\ominus$ | cyclopentene | 1 |
| D | benzothiazole | $(CH_2)_3$ $SO_3^\ominus$ | $(CH_2)_3$ $SO_3^\ominus$ $(C_2H_5)_3N^\oplus H$ | $CH_3$ | 1 | 1 | 714 | — | cyclopentene | 0 |
| E | naphthothiazole | $C_2H_5$ | $C_2H_5$ | $CH_3$ | 1 | 1 | 749 | $C_7H_7SO_3^\ominus$ | cyclopentene | 0 |
| F | benzoxazole | $C_2H_5$ | $C_2H_5$ | $CH_3$ | 1 | 1 | 640 | $I^\ominus$ | cyclopentene | 0 |
| G | 6-methoxybenzothiazole | $C_2H_5$ | $C_2H_5$ | $CH_3$ | 1 | 1 | 727 | $I^\ominus$ | cyclopentene | 0 |
| H | 6-methylbenzoselenazole | $C_2H_5$ | $C_2H_5$ | $CH_3$ | 1 | 1 | 727 | $I^\ominus$ | cyclopentene | 0 |
| I | benzothiazole | $C_2H_5$ | $C_2H_5$ | $CH_3$ | 2 | 2 | 850 | $I^\ominus$ | cyclopentene | 0 |
| J | benzoxazole | $C_2H_5$ | $C_2H_5$ | $CH_3$ | 2 | 2 | 803 | $I^\ominus$ | cyclopentene | 0 |
| K | benzothiazole | $C_2H_5$ | $C_2H_5$ | $CH_3$ | 1 | 1 | 708 | $I^\ominus$ | cyclohexene | 0 |

EXAMPLE 1

Synthesis of Dye Intermediates (III)

Dye intermediates (III), in which Q completes a cyclohexene or cyclopentene ring were prepared using a modification of the protocol described in the Journal of the Chemical Society (J.C.S) pp. 606 to 608, (1934).

The reactants; nitroethane (slight excess of 7.5 ml), cyclopentanone (8.6g) and chloroform were mixed with piperidine (2.0 ml) and refluxed with a water separator for a period of six hours until no more water was evolved. Cyclohexanone can be used to replace cyclopentanone to give a 6-membered ring for the bridging moiety. The resulting mixture was evaporated on a rotary evaporator to remove the unreacted reactants. Ether was used to dissolve the solid product, which was filtered to remove solid impurities such as piperidine carbonate. The resulting product was distilled (B.P. 60° C. at 1.0 mm Hg) for 6.0g yield. Considerable polymerisation occurs on distillation but the undistilled material can be successfully used for the next stage. The addition of a small amount of hydroquinone helps to cut down the undesired polymerisation.

Synthesis of Dye B

Dye B was prepared by the following synthesis protocol; 1-(1'-nitropropylidene) cyclopentane (0.6 g, 0.05 M), 2-acetanilidovinyl-3-ethylbenzthiazolium iodide (4.43 g, 0.01 M) and acetic anhydride (20 ml) were mixed and heated on a steam bath for a 20 minute period following addition of triethylamine (2.8 ml). The resulting mixture was cooled and filtered before thorough washing with ethanol. The solid product was recrystallized from methanol (400 ml) to yield 0.3g dye.

To synthesize undecamethincyanine dyes, 2-acetanilidobutanedienyl-3-alkyl benzthiazolium or 2-acetanilidobutanedienyl-3-alkyl benzoxazolium may replace the 2-acetanilidovinyl-3-ethylbenzthiazolium reactant in the synthesis protocol for dye B.

Synthesis of Dyes A to C and F to K

Dyes A,C and F to K were prepared using the synthesis protocol described for dye B starting from the appropriate precursors.

Synthesis of Dye D

Dye D was prepared by the following synthesis: 1-(1'-nitroethylidene) cylopentane (0.6g), 2-anilinovinylbenzthiazolium-3-sulphopropylbetaine (3.2g), acetic anhydride (20 ml) and triethylamine (4.2 ml) were mixed and heated on a steam bath for 30 minutes. The resulting mixture was cooled and filtered to liberate the solid product which was recrystallised from ethanol (80 ml) to yield 0.2g dye.

Synthesis of Dye E

Dye E was prepared in an analogous procedure to Dye D starting from the appropriate precursors.

EXAMPLE 2

Evaluation of Dyes as infrared Sensitisers for Silver Halide Photographic Materials The ability of the dyes to sensitise silver halide emulsions was evaluated with a ruthenium/iridium doped 64/36 silver chlorobromide emulsion of 0.25 micron ($\mu$m) mean grain size prepared by conventional double jet procedures. The emulsion was sulphur and gold sensitised and stabilized with a tetraazaindene stabilizer. To a 0.1 molar portion of this emulsion at 45° C. varying quantities of sensitizing dye dissolved in an appropriate solvent, were added. This was followed by an addition of a 10% solution of salicylaldoxime (1.2 ml) and 1% phenylmercaptotetrazole (1.8 ml). After heating for 30 minutes at 45° C. 4% TRITON X 200 surfactant (1 ml), commercially available from Rohm and Haas Ltd., and 4% formaldehyde (3 ml) were added.

The pH of the emulsion was adjusted to 5.5 and the weight made up to 150 g. The emulsion was then coated onto 4 mil (100 $\mu$m) clear polyester base together with a protective top coat of a gelatin solution containing dispersed silica and a polyethylacrylate latex to give a silver coverage of 3.9g per square meter. The coated material was exposed via a Xenon flash exposure (1 millisecond) through wide band interference filters (30nm) with peak transmission at 800nm, 760 nm and 730 nm respectively, together with a 0 to 4 continuous wedge. The exposed material was developed for 30 seconds at 40° C. in 3M RDC(II) developer, commercially available from Minnesota Mining and Manufacturing Company, in a graphic arts rapid processor.

The relative log speeds at each exposure were recorded at a speed point 0.01 above minimum density and are shown in Tables 2 to 4. It is not possible to provide a direct comparison between speeds at 730, 760 and 800nm because of variation in Xenon flash output and the exact filter used.

TABLE 2

Xenon Flash Exposure Through 800 nm Broad Band Filter

| DYE | DYE QUANTITY (per mole AgX) | | REL. LOG E SPEED | CONTRAST | | |
|---|---|---|---|---|---|---|
| | Amount (ml) | Concentration (w/v) | | I | II | III |
| B | 80 | 0.028% | 1.37 | 0.75 | 1.77 | 6.3 |
| A | 40 | 0.064% | 1.49 | 0.7 | 2.17 | 6.7 |
| E | 160 | 0.020% | 1.14 | 0.65 | 1.5 | 5.9 |
| G | 80 | 0.018% | 1.20 | 0.75 | 1.6 | 4.0 |

TABLE 3

Xenon Flash Exposure Through 760 nm Broad Band Filter

| DYE | DYE QUANTITY (per mole AgX) | | REL. LOG E SPEED | CONTRAST | |
|---|---|---|---|---|---|
| | Amount (ml) | Concentration (w/v) | | I | III |
| B | 80 | 0.028% | 1.24 | 0.58 | 5.27 |
| A | 40 | 0.064% | 1.20 | 0.61 | 5.00 |

TABLE 4

Zenon Flash Exposure Through 730 nm Broad Band Filter

| DYE | DYE QUANTITY (per mole AgX) | | REL. LOG E SPEED | CONTRAST | |
|---|---|---|---|---|---|
| | Amount (ml) | Concentration (w/v) | | I | III |
| B | 80 | 0.028% | 1.30 | 0.49 | 5.13 |
| A | 40 | 0.064% | 1.30 | 0.33 | 4.88 |

The contrast was measured between the following limits;
I 0.07 to 0.17
II 0.17 to 0.37
III 0.5 to 2.5 above fog.

In a further experiment the films were exposed through narrow cut (10 nm) interference filters transmitting radiation at 750, 780 and 800 nm. The relative log speed obtained at 0.01 above minimum density are given in Table 5. The level of dye used was as in Table 2.

TABLE 5

| DYE | RELATIVE LOG E SPEED* | | |
|---|---|---|---|
| | 750 nm | 780 nm | 800 nm |
| B | 1.53 | 1.56 | 1.29 |
| A | 1.56 | 1.61 | 1.31 |
| G | 1.18 | 1.23 | 1.07 |

*The speeds at different wavelengths are not directly comparable due to variations in xenon flash output and filter cut size.

The absorption of the dyes in the film was recorded using a PERKIN-ELMER spectrophotometer with a integrating sphere attachment. The wavelengths of the maximum absorption peaks so measured are given in Table 6.

TABLE 6

| DYE | MAXIMUM ABSORPTION PEAK (nm) |
| --- | --- |
| B | 755 |
| A | 757 |
| E | 580/780 |
| G | 765 |

It can be seen that the dyes of the invention provide a large degree of spectral sensitisation to the silver halide films, especially at wavelengths around 750 nm.

Referring to the accompanying diagram, wedge spectrograms obtained by exposing film incorporating Dyes E and G to radiation between 700 and 900 nm serve to illustrate the broad and substantially flat sensitisation produced by dyes of the invention between 750 and 800 nm. Such a spectral response is particularly useful as it prevents fluctuations in output wavelength of sources, such as lasers and light-emitting diodes causing unwanted changes in the sensitometric response.

"TRITON X200" and "PINAKRYPTOL YELLOW" are both trade names.

We claim:

1. A cyanine dye having a nucleus of the general formula (I):

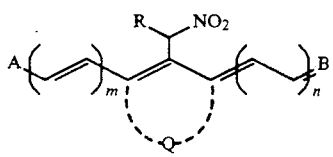

wherein;

A and B are independently selected from the group consisting of heterocyclic ring nuclei and heterocyclic fused ring nuclei so as to complete a cyanine dye, m and n independently have values of 0, 1, 2 or 3 with the proviso that $2 \leq m+n \leq 4$, R is selected from the group consisting of hydrogen, alkyl groups and aryl groups, each of which groups may be substituted, and Q represents those non-metallic atoms necessary to complete a nucleus selected from the group consisting of heterocyclic ring nuclei, carbocyclic ring nuclei, heterocyclic fused ring nuclei and carbocyclic fused ring nuclei.

2. A compound according to claim 1 wherein A and B are independently selected from the group consisting of 5,6 or 7-membered heterocyclic ring nuclei and heterocyclic fused ring nuclei of up to 14 ring atoms, each of which may possess one or more substituents selected from the group consisting of alkyl groups, halogen atoms, a hydroxy group, alkoxy groups, aryloxy groups, amino groups, a cyano group, acylamino groups, diacylamino groups, ureido groups, sulfonamido groups, acyloxy groups, sulfamoyl groups, alkylcarbonyl groups, arylcarbonyl groups, alkoxycarbonyl groups, aryloxycarbonyl groups, alkoxycarbonyl amino groups, carbamoyl groups, aryl groups, hydroxyalkyl groups, alkoxyalkyl groups, a mercapto group, alkylthio groups, arylthio groups, alkylsulfonyl groups, arylsulfonyl groups, acyl groups, aralkyl groups and alkyl groups containing a carboxyl group.

3. A compound according to claim 2 wherein A and B are independently selected from the group consisting of oxazolium, thiazolium, selenazolium, benzoxazolium, benzothiazolium, benzoselenazolium, naphthoxazolium, naphthothiazolium, naphthoselenazolium, quinolinium, isoquinolinium, pyridinium, 3H-indolium, imidazopyridazinium, benzimidazolium, imidazolium, thiodiazolium, 5-methylbenzselenazolium, 5-methoxybenzthiazolium and 5-methyl-6-methoxybenzoxazolium quaternary salts.

4. A compound according to claim 1 wherein Q represents the necessary non-metallic atoms to complete a member selected from the group consisting of 5, 6 or 7-membered heterocyclic ring nuclei, 5,6 or 7-membered carbocyclic ring nuclei, heterocyclic fused ring nuclei comprising up to 14 ring atoms and carbocyclic fused ring nuclei comprising up to 14 ring atoms, each of which may possess one or more substituents selected from the group consisting of alkyl groups, halogen atoms, a hydroxy group, alkoxy groups, aryloxy groups, amino groups, a cyano group, acylamino groups, diacylamino groups, ureido groups, sulfonamido groups, acyloxy groups, sulfamoyl groups, alkylcarbonyl groups, arylcarbonyl groups, alkoxycarbonyl groups, aryloxycarbonyl groups, alkoxycarbonyl amino groups, carbamoyl groups, aryl groups, hydroxyalkyl groups, alkoxyalkyl groups, a mercapto group, alkylthio groups, arylthio groups, alkylsulfonyl groups, arylsulfonyl groups, acyl groups, aralkyl groups and alkyl groups containing a carboxyl group.

5. A compound according to claim 1 having a nucleus of the general formula (II):

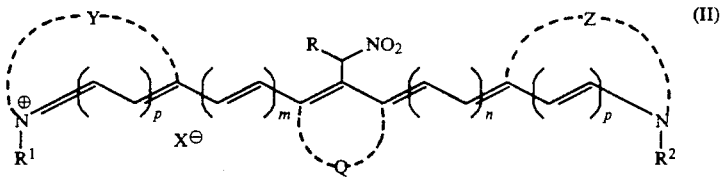

wherein;

Y represents those non-metallic atoms necessary to complete a group defined by A, Z represents those non-metallic atoms necessary to complete a group defined by B, p is 0 or 1, $R^1$ and $R^2$ are independently selected from the group consisting of hydrogen and alkyl groups which may be substituted, and $X^\ominus$ is an anion, which may be incorporated into the groups represented by $R^1$ and/or $R^2$.

6. A compound according to claim 4 wherein Q represents those non-metallic atoms necessary to complete a member selected from the group consisting of cyclopentene, cyclohexene, cycloheptene and ring structures represented by:

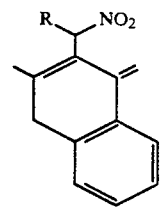

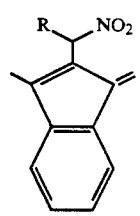

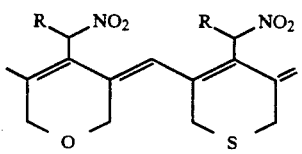

each of which may possess one or more substituents selected from the group consisting of alkyl groups, aryl groups, aralkyl groups and alkoxy groups of up to 20 carbon atoms, halogen atoms and the necessary non-metallic atoms to complete a fused ring substituent.

7. A compound according to claim 5 wherein $R^1$ and $R^2$ are independently selected from the group consisting of hydrogen and alkyl groups of up to 10 carbon atoms, each of which may possess one or more substituents selected from the groups consisting of alkyl, sulphoalkyl, carboxyalkyl and hydroxyalkyl groups of up to 5 carbon atoms, aryl groups of up to 10 carbon atoms and halogen atoms.

8. A compound according to claim 7 wherein $R^1$ and $R^2$ are independently selected from the group consisting of methyl, ethyl, propylsulphonate and butylsulphonate.

9. A compound according to claim 1 wherein R is selected from the group consisting of hydrogen, alkyl groups of up to 10 carbon atoms and aryl groups of up to 14 carbon atoms, each of which groups may possess one or more substituents selected from the group consisting of alkyl groups, halogen atoms, a hydroxy group, alkoxy groups, aryloxy groups, amino groups, a cyano group, acylamino groups, diacylamino groups, ureido groups, sulfonamido groups, acyloxy groups, sulfamoyl groups, alkylcarbonyl groups, arylcarbonyl groups, alkoxycarbonyl groups, aryloxycarbonyl groups, alkoxycarbonyl amino groups, carbamoyl groups, aryl groups, hydroxyalkyl groups, alkoxyalkyl groups, a mercapto group, alkylthio groups, arylthio groups, alkylsulfonyl groups, arylsulfonyl groups, acyl groups, aralkyl groups and alkyl groups containing a carboxyl group.

10. A compound according to claim 9 wherein R is selected from the group consisting of methyl and ethyl.

11. A cyanine dye having a nucleus of the general formula (I):

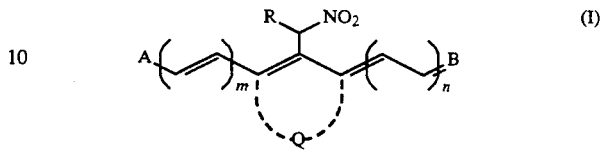

wherein:

A and B are independently selected from the group consisting of heterocyclic ring nuclei and heterocyclic fused ring nuclei so as to complete a cyanine dye, m and n independently have values of 0, 1, 2 or 3 with the proviso that $2 \leq m+n \leq 4$, R is selected from the group consisting of hydrogen, alkyl groups and aryl groups, each of which groups may be substituted, and Q represents those non-metallic atoms necessary to complete a nucleus selected from the group consisting of heterocyclic ring nuclei, carbocyclic ring nuclei, heterocyclic fused ring nuclei and carbocyclic fused ring nuclei, wherein A and B are independently selected from the group consisting of 5,6 or 7-membered heterocyclic ring nuclei and heterocyclic fused ring nuclei of up to 14 ring atoms, each of which may possess one or more substituents selected from the group consisting of alkyl groups, halogen atoms, a hydroxy group, alkoxy groups, aryloxy groups, amino groups, a cyano group, acylamino groups, diacylamino groups, ureido groups, sulfonamido groups, acyloxy groups, sulfamoyl groups, alkylcarbonyl groups, arylcarbonyl groups, alkoxycarbonyl groups, aryloxycarbonyl groups, alkoxycarbonyl amino groups, carbamoyl groups, aryl groups, a mercapto group, alkylthio groups, arylthio groups, alkylsulfonyl groups, arylsulfonyl groups, acyl groups, and aralkyl groups, 12. A compound according to claim 11 wherein A and B are independently selected from the group consisting of oxazolium, thiazolium, selenazolium, benzoxazolium, naphthothiazolium, naphthoselenazolium, quinolinium, isoquinolinium, pyridinium, 3H-indolium, imidazopyridazinium, benzimidazolium, imidazolium, thiodiazolium, 5-methylbenzselenazolium, 5-methoxybenzthiazolium and 5-methyl-6-methoxybenzoxazolium quaternary salts.

* * * * *